(12) United States Patent
Yang et al.

(10) Patent No.: US 9,889,425 B2
(45) Date of Patent: Feb. 13, 2018

(54) POROUS ADSORBENT FOR TRAPPING RADIOACTIVE IODINE GAS AND METHOD OF MANUFACTURING THE SAME

(71) Applicant: KOREA ATOMIC ENERGY RESEARCH INSTITUTE, Daejeon (KR)

(72) Inventors: Jae Hwan Yang, Daejeon (KR); Jin-Myeong Shin, Daejeon (KR); Jang Jin Park, Daejeon (KR); Geun-Il Park, Daejeon (KR)

(73) Assignee: KOREA ATOMIC ENERGY RESEARCH INSTITUTE (KR)

( * ) Notice: Subject to any disclaimer, the term of this patent is extended or adjusted under 35 U.S.C. 154(b) by 558 days.

(21) Appl. No.: 14/580,628

(22) Filed: Dec. 23, 2014

(65) Prior Publication Data

US 2016/0361701 A1    Dec. 15, 2016

(30) Foreign Application Priority Data

Dec. 24, 2013 (KR) .......................... 10-2013-0162197

(51) Int. Cl.
*C22B 30/06* (2006.01)
*B01J 20/02* (2006.01)
(Continued)

(52) U.S. Cl.
CPC .............. *B01J 20/02* (2013.01); *B01D 53/02* (2013.01); *B01D 53/04* (2013.01); *B01D 53/685* (2013.01);
(Continued)

(58) Field of Classification Search
None
See application file for complete search history.

(56) References Cited

U.S. PATENT DOCUMENTS 5,190,721 A    3/1993 Cheng
5,458,867 A  * 10/1995 Ritter .................... C01B 19/007
                                                                420/579
(Continued)

FOREIGN PATENT DOCUMENTS

JP         0727071       3/1995
JP         07328432     12/1995
JP       2012-002155     1/2012

OTHER PUBLICATIONS

Siinor et al., 2007, "Impedance study of adsorption of iodide ions at Bi(001) electrode from the aqueous solutions with constant ionic strength," Journal of Electroanalytical Chemistry, 601:39-46.

*Primary Examiner* — George Wyszomierski
(74) *Attorney, Agent, or Firm* — Riverside Law LLP

(57) ABSTRACT

Provided are an adsorbent for trapping a radioactive iodine gas generated in a process of oxidizing a nuclear fuel at a high temperature after use and a method of preparing the same, and more particularly, a radioactive iodine gas adsorbent which is formed of bismuth as a main component, thereby exhibiting an excellent radioactive iodine gas trapping capability and an excellent thermal stability after trapping, and a method of preparing the same.

An adsorbent for trapping a radioactive iodine gas prepared by a method of preparing an adsorbent for trapping a radioactive iodine gas according to the present disclosure may effectively trap a radioactive iodine off-gas generated in a nuclear fuel pre-treated oxidizing process after use.

Particularly, the adsorbent may trap iodine in a larger amount, which is twice or more, than a silver-containing zeolite widely used to trap a radioactive iodine gas, and the trapped iodine forms a stable compound, which is more advantageous for long-term storage.

In addition, since an iodine gas is trapped using inexpensive bismuth, instead of expensive silver, in consideration of (Continued)

trapping a large amount of a radioactive iodine gas, the adsorbent has very excellent economic feasibility.

5 Claims, 6 Drawing Sheets

(51) Int. Cl.
*B01D 53/04* (2006.01)
*B01D 53/68* (2006.01)
*B01J 20/30* (2006.01)
*G21F 9/02* (2006.01)
*B01D 53/02* (2006.01)

(52) U.S. Cl.
CPC ....... *B01J 20/3064* (2013.01); *B01J 20/3085* (2013.01); *G21F 9/02* (2013.01); *B01D 2253/1122* (2013.01); *B01D 2257/202* (2013.01); *G21Y 2002/501* (2013.01); *G21Y 2004/10* (2013.01); *G21Y 2004/20* (2013.01)

(56) References Cited

U.S. PATENT DOCUMENTS

| | | | | |
|---|---|---|---|---|
| 6,852,296 B2 * | 2/2005 | Bond | ................. | B01J 39/04 210/682 |
| 2010/0129280 A1 * | 5/2010 | Hirai | ................. | C01B 33/20 423/326 |
| 2015/0321189 A1 * | 11/2015 | Miyamura | ............... | B01J 41/10 428/76 |

* cited by examiner

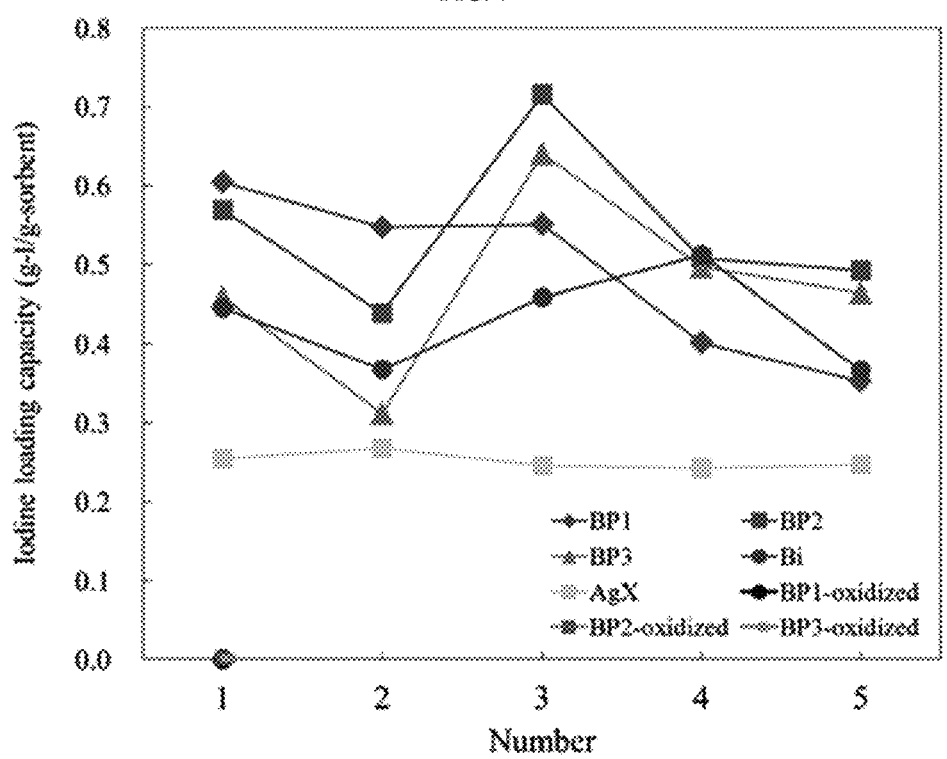

POROUS ADSORBENT FOR TRAPPING RADIOACTIVE IODINE GAS AND METHOD OF MANUFACTURING THE SAME

CROSS-REFERENCE TO RELATED APPLICATION

This application claims priority to and the benefit of Korean Patent Application No. 2013-0162197, filed on Dec. 24, 2013, the disclosure of which is incorporated herein by reference in its entirety.

BACKGROUND

1. Field of the Invention

The present disclosure relates to an adsorbent for trapping a radioactive iodine gas generated in a process of oxidizing a nuclear fuel at a high temperature after use and a method of manufacturing the same, and more particularly, to a radioactive iodine gas adsorbent which is consisted of bismuth as a main component to exhibit an excellent radioactive iodine gas trapping capability and an excellent thermal stability after trapping, and a method of preparing the same.

2. Discussion of Related Art

A nuclear fuel is recycled through a wet or dry reprocessing method after use, and volatile nuclides are volatilized through detailed processes such as nuclear fuel bundle dismantlement, cutting, removal of cladding, and a high temperature oxidizing process, which correspond to a pretreatment process of the recycling. Representative volatile nuclides are H-3, C-14, Kr-85,I-129, etc. Among them, I-129 is a representative long half life nuclide having a half life of $1.57 \times 10^7$ years, and I-129 included in a waste is easily dissolved into an $I^-$ ion when in contact with underground water. Since the $I^-$ ion dissolved in the underground water does not easily react with surrounding soil, it is highly probable that it inflicts a harm upon an ecosystem according to flow of the underground water. When a radioactive iodine gas is absorbed into a human body and accumulated in a thyroid, it can cause a severe harm, and therefore should be trapped in a safe way to prevent emission to the air. According to the U.S. environmental radioactivity standard, an annually allowed human radiation dose is 25 mSv, and annually, an iodine decontamination factor of an adsorbent should be at least 167 to trap an I-129 off-gas generated from a nuclear fuel in accordance with the standard after use.

Various methods for trapping an I-129 gas generated in a nuclear fuel treating process after use are studied. As a wet processing method, a method of scrubbing the nuclear fuel after use in a $Hg(NO_3)_2$, NaOH, or $HNO_3$ solution has been studied, and as a dry processing method, a method of trapping a gas using activated carbon, resin, silver-containing silica, or zeolite has been studied and widely used to trap an iodine gas. Today, a study for trapping an iodine gas at 150 to 200° C. using a bead-type silver exchange zeolite (AgX) is being conducted by Korean Atomic Energy Research Institute (KAERI), and iodine is physically trapped in a zeolite pore, or reacts with Ag to form a compound called AgI.

The silver-containing zeolite is used today as a basic technology to remove an I-129 gas due to various advantages such as efficiency and reproductivity for trapping an iodine gas. However, since silver is expensive, a processing cost is increased in the removal of a large amount of I-129, and silver is also a toxic element strictly regulated by the U.S. Environmental Protection Agency (EPA). Moreover, since many parts of the trapped iodine are physically trapped in a zeolite pore, thermal stability of the trapped iodine is decreased, and when the zeolite having completed trapping is thermally treated to long-term disposal in order to form a durability-strengthened wasteform, sintering can be performed by performing heat treatment with a high temperature of 1,000° C. or more.

Accordingly, as an adsorbent for trapping an I-129 off-gas generated from a nuclear fuel after use, development of a new adsorbent which is economical, has excellent iodine trapping performance and excellent thermal stability after trapping, and facilitates sintering through thermal treatment of the adsorbent becomes a target of the main object, and there is an attempt for a research on the development (refer to JP2012-215551A), but the attempt is incomplete yet.

SUMMARY OF THE INVENTION

The present disclosure is provided to solve the above-described problems of the conventional art, and the inventors studied an adsorbent which is economical and has excellent iodine gas trapping performance. As a result, when bismuth is used as a main component, a compound which is economical, has very excellent iodine gas trapping performance per unit volume, and is stable due to trapped iodine, compared to the conventional silver-containing zeolite, is formed, and thus is advantageous for long-term storage, and based on this, the present disclosure is completed.

Accordingly, the present disclosure is directed to providing a method of manufacturing a radioactive iodine gas adsorbent including the following steps:

(a) preparing a mixed solution by mixing a solution including bismuth nitrate at 10 to 20 wt % and a solution including polyvinylalcohol at 10 to 20 wt %;

(b) preparing a mixture by drying the mixed solution to remove moisture;

(c) preparing an oxide by heat-treating the mixture in an atmospheric ambience to remove polyvinylalcohol; and (d) reducing the oxide to a bismuth element state by heat-treating the oxide in a hydrogen ambience.

The present disclosure is also directed to providing a radioactive iodine gas adsorbent manufactured by the method of manufacturing the same.

The present disclosure is also directed to providing a method of trapping a radioactive iodine gas including trapping a gas containing a radioactive iodine gas by passing through the adsorbent.

However, technical objects to be accomplished by the present disclosure are limited to the above-described objects, and other objects not described above will be clearly understood by those of ordinary skill in the art from the following descriptions.

In one aspect, the present disclosure provides a method of manufacturing a radioactive iodine gas adsorbent including the following steps:

(a) preparing a mixed solution by mixing a solution including bismuth nitrate at 10 to 20 wt % and a solution including polyvinylalcohol at 10 to 20 wt %;

(b) preparing a mixture by drying the mixed solution to remove moisture;

(c) preparing an oxide by heat-treating the mixture in an atmospheric ambience to remove polyvinylalcohol; and (d) reducing the oxide to a bismuth element state by heat-treating the oxide in a hydrogen ambience.

In one embodiment of the present disclosure, in the step (a), the solution including bismuth nitrate at 10 to 20 wt % includes 10 to 50 ml of nitric acid per 100 ml of distilled water.

In another embodiment of the present disclosure, in the step (b), the drying is performed at 40 to 70° C. for 1 to 4 days.

In still another embodiment of the present disclosure, in the step (c), the thermal treatment is performed in an atmospheric ambience at 400 to 500° C. for 2 to 3 hours.

In yet another embodiment of the present disclosure, in the step (d), the reduction is performed in a 4% hydrogen ambience at 300 to 350° C. for 6 to 12 hours.

In another aspect, the present disclosure provides a radioactive iodine gas adsorbent prepared by the above preparation method.

In one embodiment of the present disclosure, the adsorbent is porous.

Furthermore, in still another aspect, the present disclosure provides a method of trapping a radioactive iodine gas which includes trapping a gas containing a radioactive iodine gas by passing through the adsorbent.

In one embodiment of the present disclosure, the trapping method is performed at 200 to 250° C. for 24 hours.

BRIEF DESCRIPTION OF THE DRAWINGS

The above and other objects, features, and advantages of the present disclosure will become more apparent to those of ordinary skill in the art by describing in detail exemplary embodiments thereof with reference to the adhered drawings, in which:

FIGS. 7 and 8 show results for comparing iodine trapping capabilities after a porous adsorbent for trapping a radioactive iodine gas, a bismuth powder sample, and an AgX sample react with iodine at 200° C. for 24 hours.

DETAILED DESCRIPTION OF EXEMPLARY EMBODIMENTS

Figure 1:
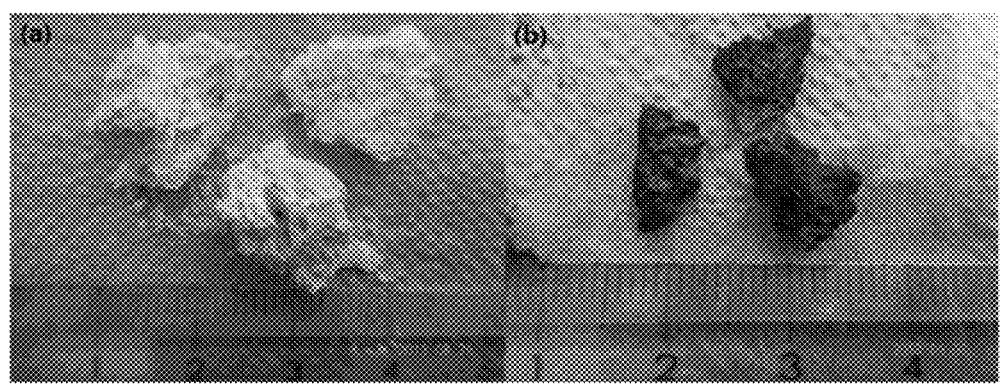
FIG. 1 is an image of a porous adsorbent for trapping a radioactive iodine gas prepared by a method of manufacturing an adsorbent according to the present disclosure: (a) an adsorbent thermally treated in an atmospheric ambience at 450° C. and (b) an adsorbent thermally treated in a 4% hydrogen ambience at 310° C.

Hereinafter, the present disclosure will be described in detail.

The present disclosure provides a method of manufacturing a radioactive iodine gas adsorbent, which includes the following steps:

(a) preparing a mixed solution by mixing a solution including bismuth nitrate at 10 to 20 wt % and a solution including polyvinylalcohol at 10 to 20 wt %;

(b) preparing a mixture by drying the mixed solution to remove moisture;

(c) preparing an oxide by thermally treating the mixture in an atmospheric ambience to remove polyvinylalcohol; and (d) reducing the oxide to a bismuth element state by heat-treating the oxide in a hydrogen ambience.

In the step (a), the mixed solution is prepared by mixing a solution including bismuth nitrate and a solution including polyvinylalcohol. The bismuth nitrate and the polyvinylalcohol should be contained within a suitable range to ultimately achieve processability of a porous adsorbent which will be prepared, and the mixed solution may be prepared by mixing a solution including 10 to 20 wt % of bismuth nitrate and a solution including 10 to 20 wt % of polyvinylalcohol, but the present disclosure is not limited thereto. In addition, the solution including 10 to 20 wt % of bismuth nitrate may include 10 to 50 ml of nitric acid per 100 ml of distilled water, but the present disclosure is not limited thereto.

In the step (b), the mixed solution prepared in the step (a) may be dried to remove moisture, thereby preparing a mixture, specifically, at 40 to 70° C. for 1 to 4 days, but the present disclosure is not limited thereto.

In the step (c), the mixture prepared in the step (b) may be heat-treated in an atmospheric ambience to remove polyvinylalcohol, thereby preparing an oxide, specifically, in an atmospheric ambience at 400 to 500° C. for 2 to 3 hours, but the present disclosure is not limited thereto.

In the step (d), the oxide prepared in the step (c) may be heat-treated in a hydrogen ambience to be reduced to a bismuth element state, specifically, in a 4% hydrogen ambience at 300 to 350° C. for 6 to 12 hours, but the present disclosure is not limited thereto.

In one exemplary embodiment of the present disclosure, an adsorbent reduced to a bismuth element state is manufactured by preparing solutions including bismuth nitrate and polyvinylalcohol, respectively, mixing the two solutions, drying the solutions in an oven for several days to remove moisture, heating the dehydrated mixture in an atmospheric ambience for several hours to remove polyvinylalcohol, and heat-treating a part of the sample again in a hydrogen ambience (refer to Example 1), and a structure of the adsorbent is analyzed to confirm to be porous form(refer to Example 2).

In another exemplary embodiment of the present disclosure, as a result of analyzing iodine gas trapping performance of an adsorbent of the present disclosure, it is confirmed that the adsorbent of the present disclosure has high trapping performance twice or more than a commercialized adsorbent (silver-containing zeolite) (refer to Example 3).

In addition, in another aspect of the present disclosure, the present disclosure provides a radioactive iodine gas adsorbent manufactured by the above method. The radioactive iodine gas adsorbent prepared by the manufacturing method of the present disclosure may be porous, and may be manufactured in an amorphous bead having a size within 1 cm. In addition, to enhance a mechanical strength of the manufacture adsorbent, a support material such as silica or alumina may be mixed. Since the porous adsorbent according to the present disclosure which is manufactured using bismuth and polyvinylalcohol may dramatically enhance trapping performance of an iodine gas and increase thermal stability of the trapped iodine over 100° C., compared to conventional silver-containing zeolite, the adsorbent is advantageous for long-term disposal.

In still another aspect of the present disclosure, the present disclosure provides a method of trapping a radioactive iodine gas, which includes trapping a gas containing a radioactive iodine gas by passing through the adsorbent. Here, the reaction between the radioactive iodine gas and the adsorbent may be performed at 200 to 250° C. for 24 hours.

Hereinafter, exemplary examples will be provided to help in understanding the present disclosure. However, the following examples are merely provided to facilitate the understanding of the present disclosure, and the scope of the present disclosure is not limited to the following examples.

EXAMPLES

Example 1

Manufacture of Radioactive Iodine Gas Adsorbent

To manufacture a porous adsorbent consisted of bismuth, a solution was prepared by adding 100 g of bismuth nitrate to 100 ml of distilled water, and adding 50 ml of nitric acid as a catalyst to completely dissolve the mixture. Mixed solutions were prepared by preparing three types of solutions prepared by dissolving 50, 75, and 100 g of polyvinylalcohol in 500 ml of distilled water, respectively, and mixing each solution with the previously prepared bismuth nitrate solution. To evaporate the distilled water included in the prepared mixed solution, the solution was sufficiently dried in a drier at 70° C. for 3 to 4 days, thereby obtaining a gel-type material. Here, when a drying time is excessively long, the gel shape may be deformed. The dried material was put into a heat treatment furnace and thermally treated at 400° C. for 3 hours to increase a temperature in an atmospheric ambience by 1° C. per minute in order to remove polyvinylalcohol, and then an image of the prepared material (oxide) is shown in FIG. 1(a).

As shown in FIG. 1(a), it can be confirmed that the adsorbent was yellow, and had a porous type having many pores on its surface after polyvinylalcohol was removed.

Afterward, some of the samples was taken after thermal treatment, and reduced in a 4% hydrogen ambience at 310° C. for 12 hours, thereby manufacturing a radioactive iodine gas adsorbent, and an image of the radioactive iodine gas adsorbent is shown in FIG. 1(b).

Example 2

Analysis of Structure of Radioactive Iodine as Adsorbent 2-1. X-ray Diffraction Analysis X-ray diffraction analysis (XRD, Bruker) was performed to each radioactive iodine gas adsorbent manufactured by Example 1, and analysis results are shown in FIG. 2.

Figure 2:
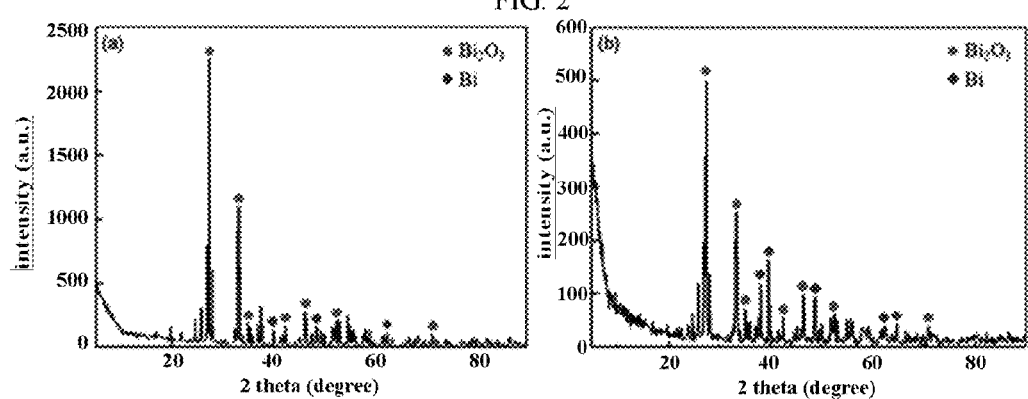
FIG. 2 shows X-ray diffraction analysis results for a radioactive iodine gas adsorbent prepared by a method of preparing an adsorbent according to the present disclosure: (a) an adsorbent thermally treated in an atmospheric ambience at 450° C. and (b) an adsorbent thermally treated in a 4% hydrogen ambience at 310° C.

As shown in FIG. 2, it was confirmed that a sample manufactured through thermal treatment at 400° C. showed a main crystal peak for $Bi_2O_3$ (refer to FIG. 2(a)), and a sample produced through reduction in a hydrogen ambience showed a very weak intensity of a $Bi_2O_3$ crystal peak, and a relatively strong intensity of a Bi crystal peak (refer to FIG. 2(b)). It was seen from the results that most parts of the bismuth oxide present in the sample were reduced into Bi due to hydrogen reduction.

2-2. Scanning Electron Microscopy (SEM)

Figure 3:
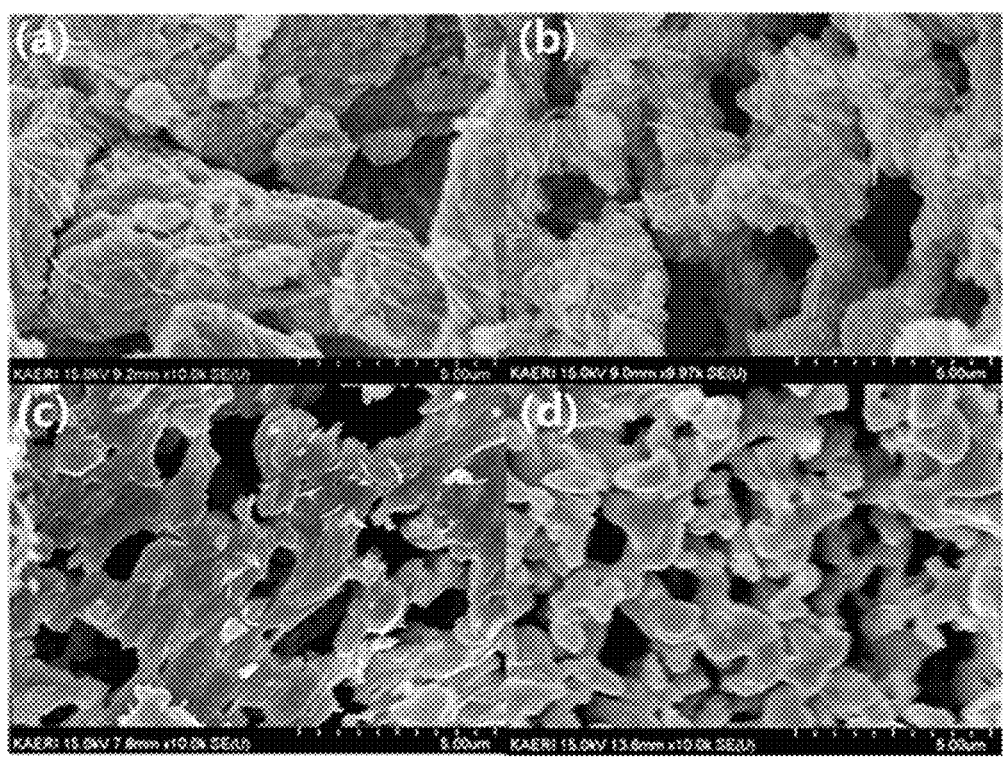
FIG. 3 shows results obtained by observing a radioactive iodine gas adsorbent manufactured by a method of manufacturing an adsorbent according to the present disclosure, using a scanning electron microscope: (a) a bismuth powder sample, (b) a porous adsorbent manufactured by adding 50 g of polyvinylalcohol, (c) a porous adsorbent manufactured by adding 75 g of polyvinylalcohol, and (d) a porous adsorbent manufactured by adding 100 g of polyvinylalcohol.

Each adsorbent manufactured by adding 50, 75, and 100 g of polyvinylalcohol according to Example 1 were observed using a scanning electron microscope (SEM, Hitachi), and results are shown in FIG. 3.

As shown in FIG. 3, a bismuth powder sample did not have pores, except small pores present on a boundary surface of powder particles (refer to FIG. 3(a)), and it can be confirmed that the sample manufactured by adding each of 50, 75, and 100 g of polyvinylalcohol had many pores (refer to FIGS. 3(b) to 3(d)). It can be seen from the results that the part of the sample from which the polyvinylalcohol was removed had pores.

Example 3

Examination of Trapping Performance and Thermal Stability of Radioactive Iodine as Adsorbent A trapping reaction with iodine was performed to each of three types of samples manufactured by adding 50, 75, and 100 g of polyvinylalcohol in Example 1 and performing thermal treatment at 400° C., three types of samples prepared through reduction at 310° C., bismuth powder, and an AgX sample. To this end, approximately 0.3 g each of the samples and the iodine crystal powder was taken, and put into an alumina furnace, closed with a lid, and subjected to a trapping reaction at 200° C. for 24 hours.

3-1. Analysis Using SEM-EDS

Figure 4:
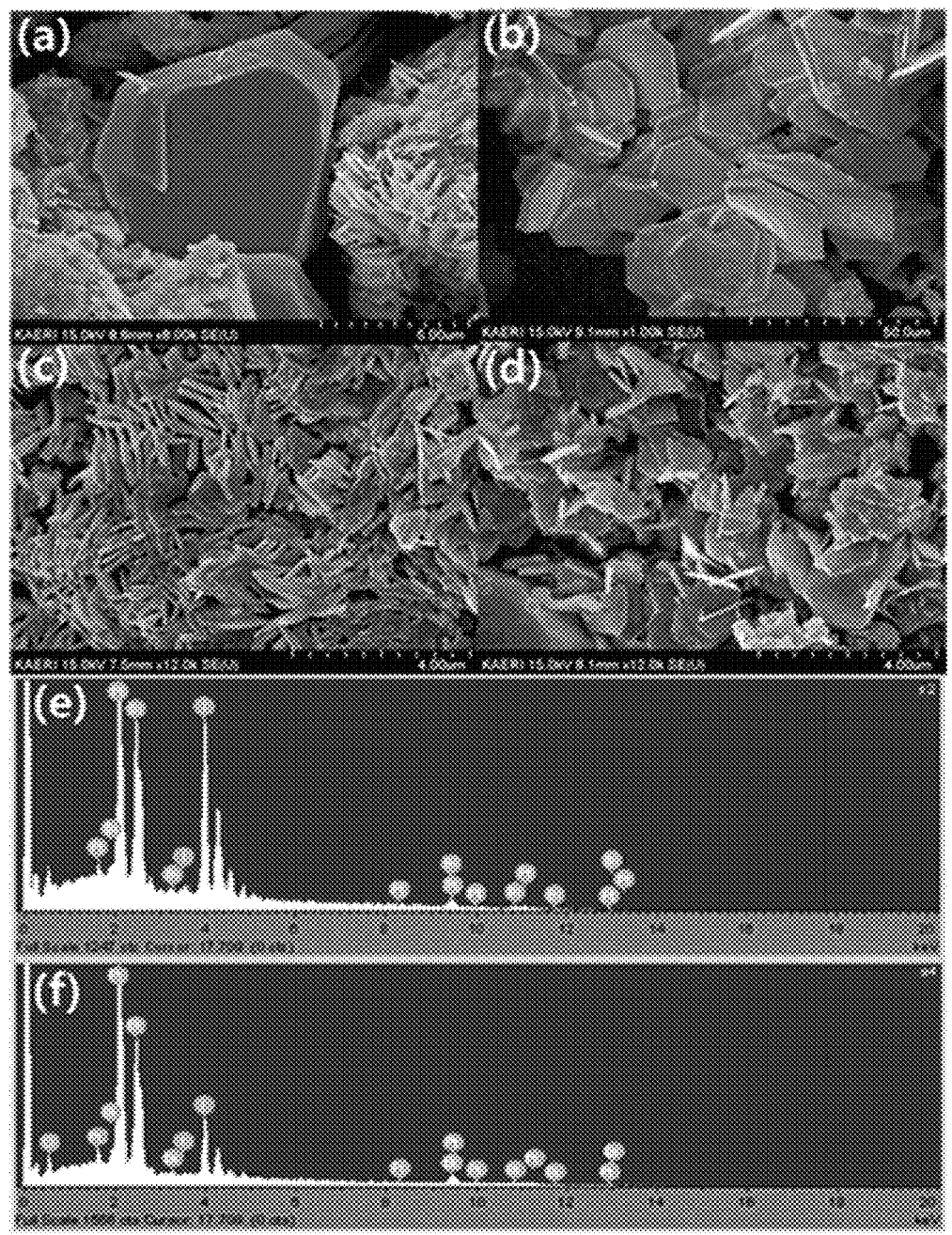
FIG. 4 shows results obtained by observing a microstructure and an X-ray element spectrum using a scanning electron microscope after a radioactive iodine gas adsorbent manufactured by a method of manufacturing an adsorbent according to the present disclosure reacts with iodine at 200° C. for 24 hours: (a) a bismuth powder sample, (b) a porous adsorbent manufactured by adding 50 g of polyvinylalcohol, (c) a porous adsorbent manufactured by adding 75 g of polyvinylalcohol, (d) a porous adsorbent manufactured by adding 100 g of polyvinylalcohol, and (e) and (f) X-ray element spectrums characteristically shown from four samples.

A bismuth powder sample, and samples manufactured by adding 50, 75, and 100 g of polyvinylalcohol and being reduced at 310° C., respectively, were reacted with iodine at 200° C. for 24 hours, and microstructures thereof were observed using SEM-EDS, and therefore results are shown in FIG. 4.

As shown in FIG. 4, it can be confirmed that, compared to before reacting with iodine, structures having various shapes such as a rock, a plate, a rod, and a rose were produced (refer to FIGS. 4(a) to 4(d)).

In addition, representative atomic analysis for each sample was performed through an atomic analysis spectrum, and therefore analysis results are shown in FIG. 4.

As shown in FIG. 4, it can be confirmed that each structure was Bi, I, or a material consisted of Bi, O, or I (refer to FIGS. 4(e) and 4(f)).

3-2. X-ray Diffraction Analysis

Figure 5:
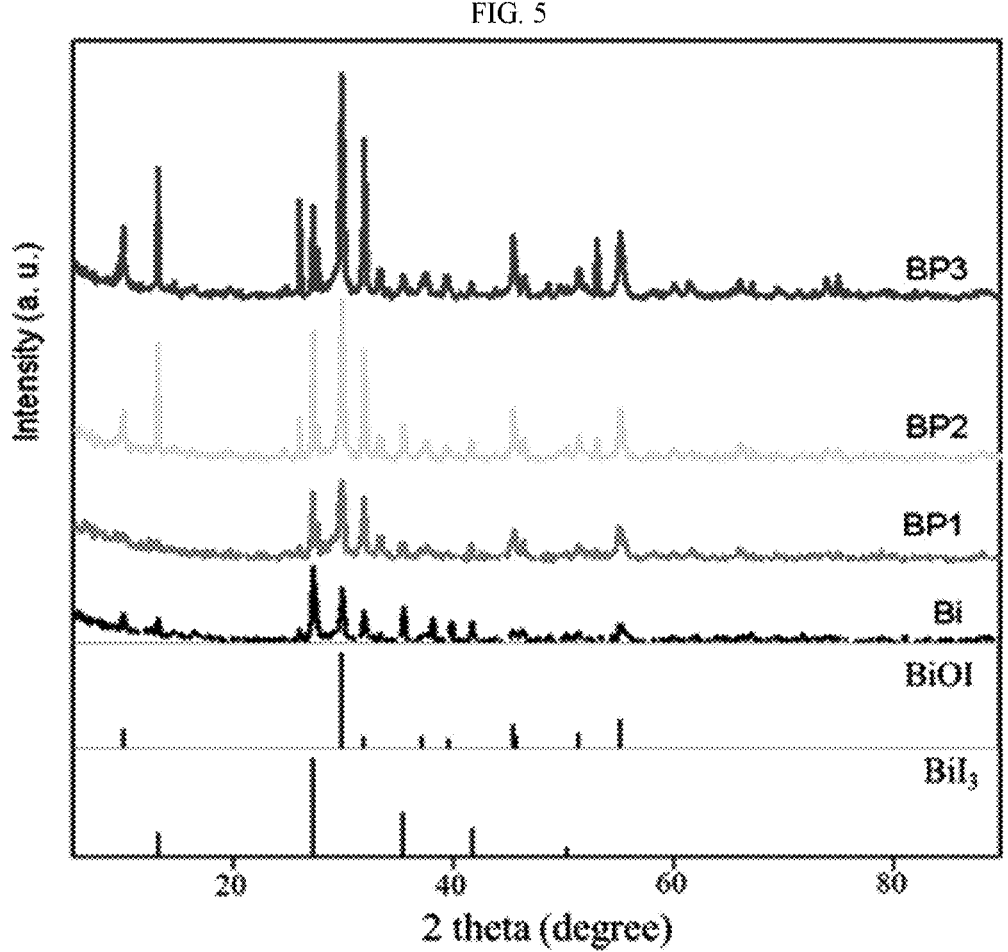
FIG. 5 shows X-ray diffraction analysis results after a radioactive iodine gas adsorbent manufactured by a method of manufacturing an adsorbent according to the present disclosure reacts with iodine at 200° C. for 24 hours.

A bismuth powder sample and samples manufactured by adding 50, 75, and 100 g of polyvinylalcohol and being reduced at 310° C., respectively, were reacted with iodine at 200° C. for 24 hours, and crystal structures thereof were observed by X-ray diffraction analysis, and therefore results are shown in FIG. 5.

As shown in FIG. 5, it can be confirmed that most of crystal peaks shown from each sample after the iodine reaction corresponded to BiOI and $BiI_3$ crystals, and in the uppermost graph in FIG. 5, the more stronger BiOI crystal peak was shown. Here, Bi, BP1, BP2, and BP3 mean bismuth powder and samples manufactured by adding 50, 75, and 100 g of polyvinylalcohol, respectively.

3-3. Thermogravimetric Analysis

Figure 6:
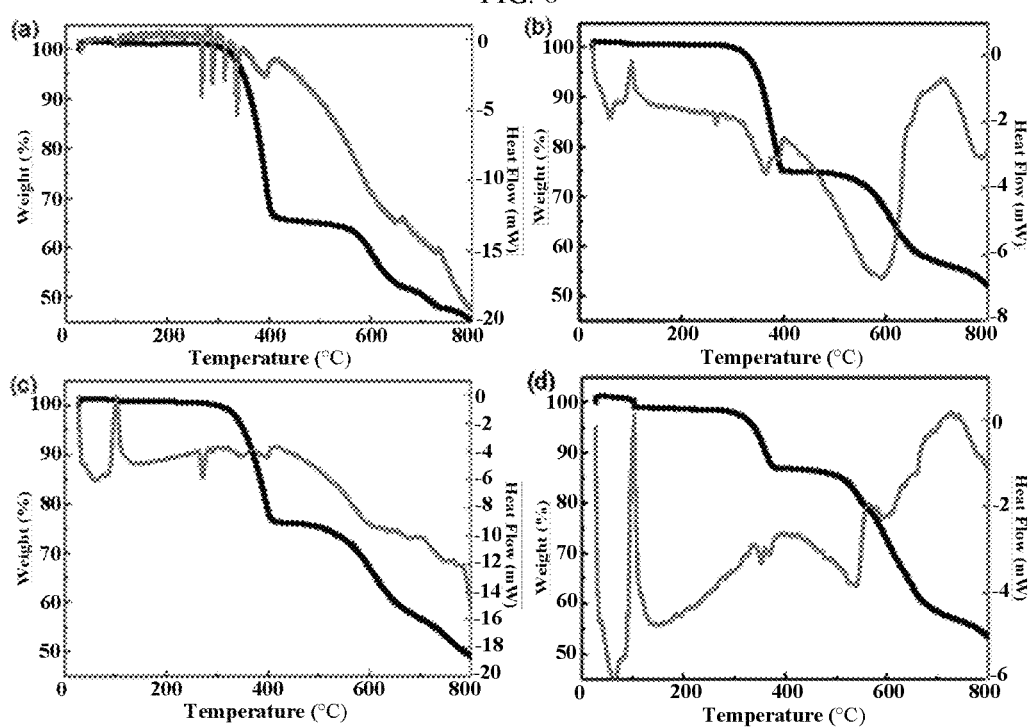
FIG. 6 shows results obtained from weight loss and heat flow curves using thermogravimetric analysis after a radioactive iodine gas adsorbent manufactured by a method of manufacturing an adsorbent according to the present disclosure reacts with iodine at 200° C. for 24 hours: (a) a bismuth powder sample, (b) a porous adsorbent manufactured by adding 50 g of polyvinylalcohol, (c) a porous adsorbent manufactured by adding 75 g of polyvinylalcohol, and (d) a porous adsorbent manufactured by adding 100 g of polyvinylalcohol.

A bismuth powder sample, and samples prepared by adding 50, 75, and 100 g of polyvinylalcohol and being reduced at 310° C., respectively, were reacted with iodine at 200° C. for 24 hours, and thermal stability of each sample was analyzed by thermogravimetric analysis (TG-DSC, Setaram), and therefore results are shown in FIG. 6.

As shown in FIG. 6, it was confirmed that a weight loss was shown from all of four samples at 300° C. or more, and then a weight loss was shown again at 500° C. or more. Meanwhile, compared to FIG. 5, it can be confirmed that the first weight loss was exhibited from volatilization of $BiI_3$, and the second weight loss was exhibited from volatilization of BiOI.

3-4. Comparison of Trapping Performance with Silver-containing Zeolite

A bismuth powder sample, samples manufactured by adding each of 50, 75, and 100 g of polyvinylalcohol and performing reduction at 310° C., and an AgX sample were reacted with iodine at 200° C. for 24 hours, and trapping performance of the iodine was measured and compared, and therefore the comparison results are shown in FIGS. 7 and 8.

As shown in FIGS. 7 and 8, it can be confirmed that AgX was capable of trapping approximately 0.25 g of iodine per a sample unit weight, while the bismuth powder sample and the sample manufactured by adding polyvinylalcohol and performing reduction exhibited higher trapping performances than the iodine trapping performance of the AgX. As a result of tests repeated five times, it can be confirmed that the maximum iodine trapping performance was approximately 0.72 g per sample unit weight, and the maximum average trapping performance was approximately 0.55 g (refer to FIG. 8).

Meanwhile, the iodine trapping performances exhibited in the tests performed five times have some differences as shown in the graph, and thus it is considered to be caused by non-uniformity generated in the process of manufacturing a sample. That is, it was considered that since each part of the sample finally prepared had a difference in pore characteristic due to non-uniform distribution of the polyvinylalcohol, even with the same adsorbent, there was a difference in iodine trapping performance in each test.

From the result, it was confirmed that the porous adsorbent manufactured in the present disclosure to have trapping performance twice or more than that of AgX could more effectively trap an iodine gas than commercialized AgX. Moreover, it was confirmed by the test that an unreduced sample could not trap the iodine at all, and it was seen that, to actively trap an iodine, bismuth present in a sample should be in an element state, not an oxide state.

An adsorbent for trapping a radioactive iodine gas manufactured by a method of manufactureing an adsorbent for trapping a radioactive iodine gas according to the present disclosure can effectively trap a radioactive iodine off-gas generated in a nuclear fuel pre-treated oxidizing process after use.

Particularly, the adsorbent can trap iodine in a larger amount, which is twice or more, than a silver-containing zeolite widely used to trap a radioactive iodine gas, and the trapped iodine forms a stable compound, which is more advantageous for long-term storage.

In addition, since an iodine gas is trapped using inexpensive bismuth, instead of expensive silver, in consideration of trapping a large amount of a radioactive iodine gas, the adsorbent has very excellent economic feasibility.

While the present disclosure has been shown and described with reference to certain exemplary embodiments thereof, it will be understood by those skilled in the art that various changes in form and details may be made therein without departing from the scope of the present disclosure as defined by the appended claims.

What is claimed is:

1. A method of manufacturing a radioactive iodine gas adsorbent, comprising the following steps of:
    (a) preparing a mixed solution by mixing a solution including 10 to 20 wt % of bismuth nitrate and a solution including 10 to 20 wt % of polyvinylalcohol;
    (b) preparing a mixture by drying the mixed solution to remove moisture;
    (c) preparing an oxide by heat-treating the mixture in an air atmosphere to remove the polyvinylalcohol; and
    (d) reducing the oxide to an elemental bismuth state by heat-treating the oxide in a hydrogen-containing atmosphere.

2. The method according to claim 1, wherein, in the step (a), the solution including 10 to 20 wt % of bismuth nitrate includes 10 to 50 ml of nitric acid per 100 ml of distilled water.

3. The method according to claim 1, wherein the drying in the step (b) is performed at 40 to 70° C. for 1 to 4 days.

4. The method according to claim 1, wherein the heat-treating in step (c) is performed in an air atmosphere at 400 to 500° C. for 2 to 3 hours.

5. The method according to claim 1, wherein the reduction in the step (d) is performed in a 4% hydrogen-containing atmosphere at 300 to 350° C. for 6 to 12 hours.

* * * * *